United States Patent
Hong et al.

(10) Patent No.: US 10,629,918 B2
(45) Date of Patent: *Apr. 21, 2020

(54) FUEL CELL STACK WITH ENHANCED FREEZE-THAW DURABILITY

(75) Inventors: Bo Ki Hong, Seoul (KR); Kook Il Han, Seoul (KR); Sae Hoon Kim, Gyeonggi-do (KR); Jae Jun Ko, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,168

(22) Filed: Apr. 1, 2011

(65) Prior Publication Data
US 2012/0141902 A1 Jun. 7, 2012

(30) Foreign Application Priority Data
Dec. 3, 2010 (KR) .................. 10-2010-0122439

(51) Int. Cl.
*H01M 8/00* (2016.01)
*H01M 8/023* (2016.01)
(Continued)

(52) U.S. Cl.
CPC ......... *H01M 8/023* (2013.01); *H01M 8/0234* (2013.01); *Y02P 70/56* (2015.11)

(58) Field of Classification Search
CPC .......... H01M 2/14; H01M 2/145; H01M 2/16; H01M 2/1606; H01M 2/1613; H01M 2/162; H01M 2/1633; H01M 2/164; H01M 2/1646; H01M 2/1653; H01M 2/166; H01M 2/1666; H01M 2/18
(Continued)

(56) References Cited

U.S. PATENT DOCUMENTS 7,455,928 B2 11/2008 Mathias et al.
7,632,589 B2 12/2009 Kawashima et al.
(Continued)

FOREIGN PATENT DOCUMENTS

CN 1066307 A 11/1992
CN 101068953 A 11/2007
(Continued)

OTHER PUBLICATIONS

Weidner et al. (Engineering a Membrane Electrode Assembly, 2003).*
Chapter 7 Advanced Composite Materials, pp. 1-58.*

*Primary Examiner* — Allison G Fitzsimmons
(74) *Attorney, Agent, or Firm* — Mintz Levin Cohn Ferris Glovsky and Popeo, P.C.; Peter F. Corless (57) ABSTRACT

The present invention provides a fuel cell stack with enhanced freeze-thaw durability. In particular, the fuel cell stack includes a gas diffusion layer between a membrane-electrode assembly and a bipolar plate. The gas diffusion layer has a structure that reduces contact resistance in a fuel cell and is cut at a certain angle such that the machine direction (high stiffness direction) of GDL roll is not in parallel with the major flow field direction of the bipolar plate, resulting in an increased GDL stiffness in a width direction perpendicular to a major flow field direction of a bipolar plate.

13 Claims, 8 Drawing Sheets

(51) Int. Cl.
*H01M 8/0234* (2016.01)
*B01D 61/00* (2006.01)

(58) Field of Classification Search
USPC ....... 429/456, 457, 452, 463, 467, 471, 507, 429/523, 535
See application file for complete search history.

(56) References Cited

U.S. PATENT DOCUMENTS

| | | | |
|---|---|---|---|
| 2001/0041281 A1* | 11/2001 | Wilkinson .......... | H01M 8/0258 429/480 |
| 2002/0051901 A1* | 5/2002 | Zuber et al. .................. | 429/32 |
| 2003/0175575 A1* | 9/2003 | Zuber et al. .................. | 429/35 |
| 2005/0042500 A1 | 2/2005 | Mathias et al. | |
| 2007/0148526 A1* | 6/2007 | Farrington et al. ............ | 429/38 |
| 2008/0102326 A1 | 5/2008 | Falta | |
| 2008/0241608 A1 | 10/2008 | Zhang et al. | |
| 2010/0143813 A1 | 6/2010 | Goebel et al. | |

FOREIGN PATENT DOCUMENTS

| | | |
|---|---|---|
| CN | 101103479 A | 1/2008 |
| DE | 112004001525 T5 | 6/2006 |
| DE | 102010002392 A1 | 6/2011 |
| JP | 2002-110198 A | 4/2002 |
| JP | 2004-146226 A | 5/2004 |
| JP | 2005100813 A | 4/2005 |
| JP | 2006079856 A | 3/2006 |
| JP | 2006-222024 A | 8/2006 |
| JP | 2007-176750 A | 7/2007 |
| JP | 2007-518218 A | 7/2007 |
| JP | 2009283352 A | 12/2009 |
| KR | 10-2001-0074955 | 8/2001 |
| KR | 10-2005-0077293 | 8/2005 |
| KR | 10-0750457 | 12/2006 |
| KR | 10-0802749 B1 | 2/2008 |
| WO | WO 9713287 A2 * | 4/1997 |
| WO | 2006/075681 A1 | 7/2006 |

* cited by examiner

FIG.1

(PRIOR ART)

FUEL CELL STACK WITH ENHANCED FREEZE-THAW DURABILITY

CROSS-REFERENCE TO RELATED APPLICATION

This application claims under 35 U.S.C. § 119(a) the benefit of Korean Patent Application No. 10-2010-0122439 filed Dec. 3, 2010, the entire contents of which are incorporated herein by reference.

BACKGROUND

(a) Technical Field

The present invention relates to a fuel cell stack with enhanced freeze-thaw durability. More particularly, it relates to a fuel cell stack that is designed to reduce contact resistance in a fuel cell to prevent water that is a by-product of an electrochemical reaction from being frozen under a sub-zero temperature condition when reactant gases such as hydrogen and oxygen gases are supplied to the fuel cell stack.

(b) Background Art

Polymer electrolyte membrane fuel cells (PEMFCs) have been widely used as a fuel cell for a vehicle. For a fuel cell stack, manufactured by stacking hundreds of unit cells of the polymer electrolyte membrane fuel cell, to be properly mounted in a vehicle, it is essential that it shows high power performance of at least tens of kilowatts (kW), and thus requires stable operation in a wide range of current density.

In a reaction for generating electricity in a fuel cell, after hydrogen supplied to the anode at which oxidation occurs in a membrane-electrode assembly (MEA) of the fuel cell is divided into hydrogen ions (protons) and electrons, hydrogen ions move to the cathode at which reduction occurs through a polymer electrolyte membrane, and electrons move to the cathode through an external circuit. Also, in the cathode, oxygen molecules, hydrogen ions, and electrons react with each other to generate electricity and heat and water as a by-product.

If a suitable amount of water is generated from the electrochemical reaction in the fuel cell, the generated water may serve to maintain suitable humidity conditions for the membrane-electrode assembly. However, if the amount of water generated is excessive, the excessive water may not be removed at a high current density, thus causing flooding of water throughout the cell. The flooding may prohibit reactant gases from being efficiently supplied to the fuel cell, thus deepening a voltage loss.

Water generates from the reaction between hydrogen and oxygen in the air in the polymer electrolyte membrane fuel cell. If the freeze-thaw cycle is repetitively changed from a sub-zero temperature to an ordinary temperature, components of the fuel cell and interfaces between the components such as an MEA and a gas diffusion layer (GDL) may be physically damaged thereby reducing its electrochemical performance and durability. Therefore, for the stable operation of a hydrogen fuel cell vehicle, it is crucial to increase the durability of a fuel cell stack under such a freeze-thaw cycle condition.

Various attempts have been conducted to increase the freeze-thaw durability of a typical fuel cell. For example, Korean Pat. No. 10-0802749, registered in 2008, discloses a technology of increasing the durability by optimizing a fuel cell cooling line structure to reduce the freeze-thaw cycle. U.S. Pat. Application Publication Nos. 2010/0143813 and 2008/0102326 disclose technologies of increasing freeze start capability by optimizing a method for controlling operation of a fuel cell. Also, U.S. Pat. Application Publication No. 2008/0241608 discloses a method of operating a fuel cell by removing ice generated at a sub-zero temperature by heat. However, these methods are too complex to apply in reality, and their effects are also limited. Accordingly, for a mass production of hydrogen fuel cell vehicles, it is necessary to develop a new technology to improve the freeze-thaw durability while at the same time making the implementation process as simple as possible.

As commercialization of fuel cells progresses, much research and development is being conducted on a gas diffusion layer (GDL) that is an essential component for managing water in a fuel cell. A GDL is attached to the outer surface of anode and cathode catalyst layers in an MEA of a fuel cell to perform various functions such as supply of reactant gases (hydrogen and oxygen gases in the air), transport of electrons generated from an electrochemical reaction, and minimize flooding in the fuel cell by discharging water generated from the reaction.

A GDL has been currently commercialized has a dual layer structure of a microporous layer (MPL) and a macro-porous substrate (or backing). The MPL has a pore size of less than about 1 μm when measured by a mercury intrusion method. The macro-porous substrate, on the other hand, has a pore size of about 1 μm to about 300 μm.

The MPL of the GDL may be manufactured by mixing carbon power such as acetylene black carbon and black pearls carbon with hydrophobic agent based on polytetrafluoroethylene (PTFE) and fluorinated ethylene propylene (PEP), and then may be coated on one or both surfaces of the macro-porous substrate according to applications. On the other hand, the macro-porous substrate of the GDL may be typically formed of carbon fiber and hydrophobic agents based on PTFE or PEP, and may include carbon fiber cloth, carbon fiber felt, and carbon fiber paper.

Since the GDL for the fuel cell has to be designed to have appropriate performance according to operation conditions and specific application fields of the fuel cell for, e.g., transportation, portable, and residential power generation, the GDL based on either carbon fiber felt or carbon fiber paper (in which overall characteristics such as supply of reactant gas, discharge of generated water, and compressibility/handling property for stack assembly are excellent), is more widely used for a fuel cell vehicles than carbon fiber cloth.

Also, a GDL has a significant influence on performance of a fuel cell according to various characteristics such as gas permeability, compressibility, degree of hydrophobicity of MPL and macro-porous substrate, structure of carbon fiber, porosity/pore distribution, tortuosity of pore, electrical resistance, and bending stiffness. Particularly, the GDL has a significant influence on the performance in the mass transport zone.

The gas diffusion layer needs to show excellent performance in a fuel cell, and have appropriate stiffness for excellent handling properties when hundreds of unit cells are assembled into a fuel cell stack. On the other hand, when the stiffness of the gas diffusion layer is too high in a direction of a roll, the gas diffusion layer is difficult to store in a roll form, thus reducing its mass-productivity capabilities.

Figure 1:
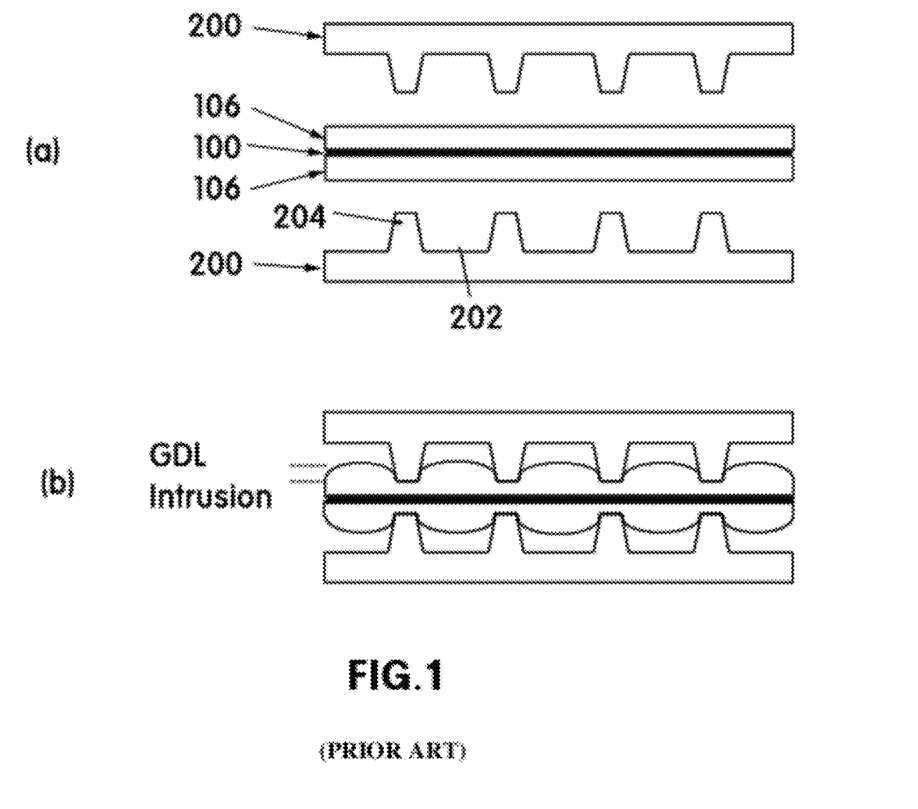
FIG. 1 is a diagram illustrating intrusion of a GDL into a main flow field of a bipolar plate by bipolar plate land compression when fuel cells are assembled to each other in a typical stack.

Alternatively as noted above, when the stiffness of a gas diffusion layer 106 is deficient in a fuel cell, as shown in FIG. 1, the GDL 106 may intrude into a flow field channel 202 of a bipolar plate (also called as a separator) 200 (thus causing GDL intrusion). Thus, when the GDL 106 intrudes into the flow field channel 202 of the bipolar plate 200, a channel space for transferring materials such as reactant gases and generated water may not have enough room. Also, since the contact resistance between the GDL 106 and the rib (or land) 204 of the bipolar plate 200 and between the GDL 106 and an MEA 100 increases, the performance of the fuel cell may be considerably reduced.

Particularly, when the contact resistance in a cell increases, an interface between the GDL and the MEA or between the GDL and the bipolar plate may not be suitably maintained to generate an unnecessary gap. In this case, water generated in the fuel cell may be frozen to ice in the unnecessary gap under a freeze-thaw condition.

Thus, when there is ice generation, repetitive freeze-thaw cycles may damage the interface between components in the fuel cell. Accordingly, in order to increase the durability of a fuel cell, it is important to reduce the contact resistance so as not to generate a gap at the interface among the components of the fuel cell.

Figure 2:
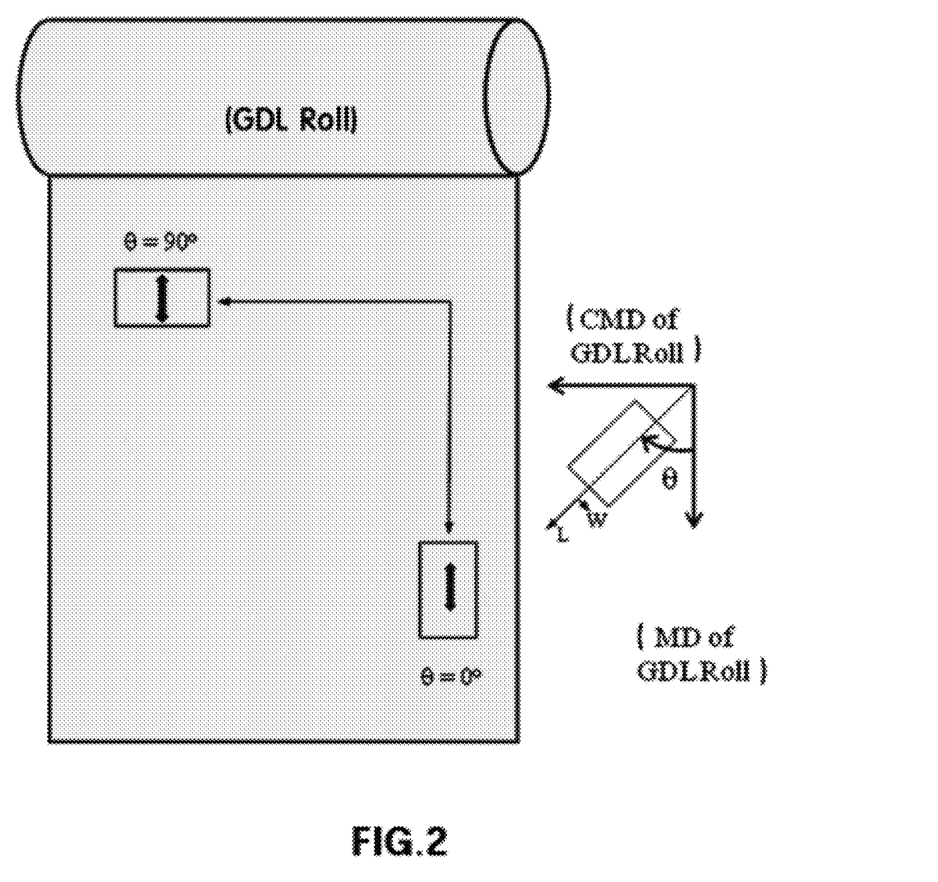
FIG. 2 is a diagram illustrating a method (90° GDL) of cutting the sheet of a GDL according to an exemplary embodiment of the present invention, compared to a method (0°GDL) of cutting the sheet of a GDL according to a related art.
Figure 3:
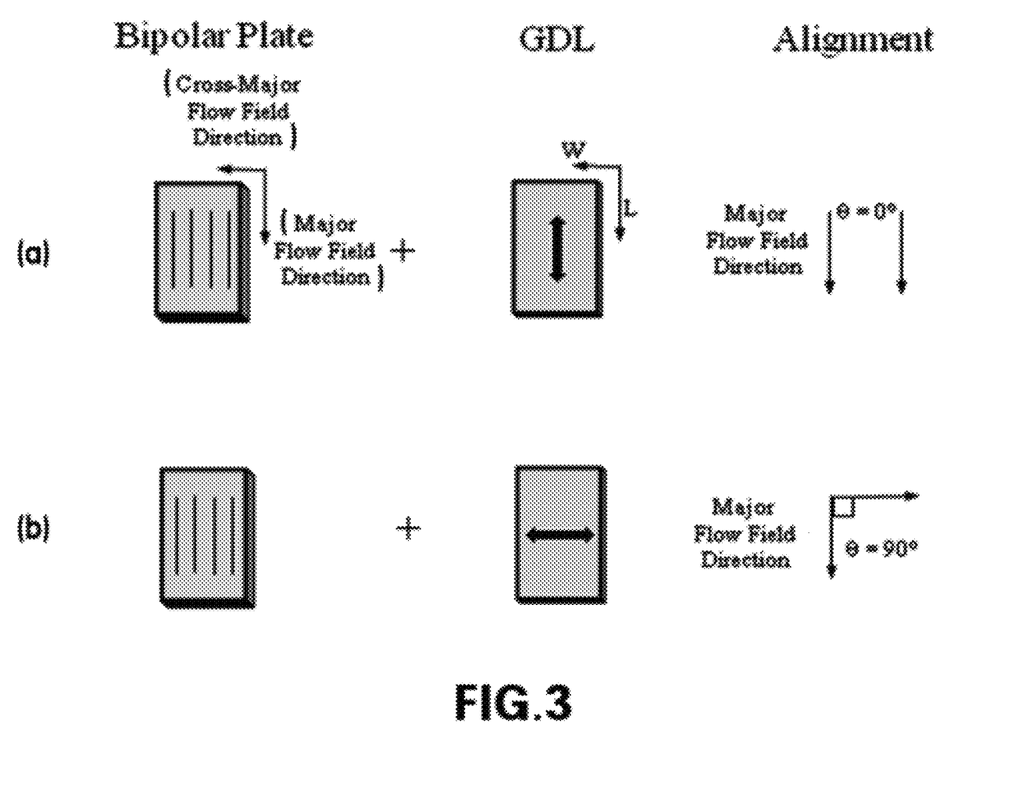
FIG. 3 is a diagram illustrating (a) an arrangement of a GDL's MD (high stiffness direction) and a major flow field direction of the bipolar plate in a 0° GDL-applied stack according to related art and (b) an arrangement of a GDL's MD (high stiffness direction) and a major flow field direction of the bipolar plate in a 90° GDL-applied stack according to an exemplary embodiment of the present invention.

Generally, a bipolar plate for a fuel cell includes a major flow field and a minor flow field. Here, it is necessary for a GDL not to intrude into a channel of the major flow field. Therefore, it is important to increase the stiffness of the GDL oriented in the width (W) direction which is perpendicular to the major flow field direction of the bipolar plate than that oriented in the length (L) direction which is parallel with the major flow field direction of the bipolar plate (see FIGS. 2 and 3). Otherwise, as shown in FIG. 1, when a GDL having a low stiffness is arranged in the width direction of the major flow field of the bipolar plate, the GDL may further intrude into the major flow field channel of the bipolar plate. Accordingly, since a space in which ice may be generated at a sub-zero temperature (due to increase of damage or deformation of the interface in the fuel cell) increases, the freeze-thaw durability of the fuel cell may be reduced.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell stack that can reduce contact resistance in a fuel cell and improve freeze-thaw durability, using a GDL that is manufactured by using a typical art stack fabrication process without an additional modification of the process and optimizing a method of cutting the GDL in a sheet size appropriate to the fuel cell, i.e., a GDL in which its stiffness in a width direction perpendicular to a major flow field direction of a bipolar plate is increased by cutting a rolled GDL material at a certain angle such that a machine direction (MD) or high stiffness direction of GDL roll is not in parallel with the major flow field direction of the bipolar plate in order to minimize the intrusion of the GDL into a gas channel of the bipolar plate.

In one aspect, the present invention provides a fuel cell stack with enhanced freeze-thaw durability, the fuel cell stack including a GDL between an MEA and a bipolar plate, wherein the GDL has a structure that reduces contact resistance in a fuel cell and the GDL has a stiffness in a width direction perpendicular to a major flow field direction of a bipolar plate that is increased by cutting a rolled GDL material at a certain angle such that the MD (high stiffness direction) of GDL roll is not in parallel with the major flow field direction of the bipolar plate.

In some embodiments of the present invention, the GDL may be cut such that an angle between the MD (high stiffness direction) of the GDL roll and the major flow field direction of the bipolar plate is greater than about 0 degree, and equal to or smaller than about 90 degrees.

In another embodiment, the GDL may be cut such that an angle between the MD (high stiffness direction) of the GDL roll and the major flow field direction of the bipolar plate is greater than about 25 degrees, and equal to or smaller than about 90 degrees.

In still another embodiment, the GDL may have a Taber bending stiffness of the MD (high stiffness direction) of the GDL roll that ranges from about 20 $g_f$·cm to about 150 $g_f$·cm.

In yet another embodiment, the GDL may have a Taber bending stiffness of the MD (high stiffness direction) of the GDL roll that ranges from about 50 $g_f$·cm to about 100 $g_f$·cm.

In still yet another embodiment, the GDL may include a MPL contacting an outer surface of each electrode of an MEA, and a macro-porous substrate contacting a flow field of the bipolar plate, and the macro-porous substrate may be formed of one of carbon fiber felt and carbon fiber paper or a combination thereof.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 7 is a graph illustrating the high frequency resistances before and after 1000 freeze-thaw cycles of the 0°

GDL-applied stack according to a related art and the 90° GDL-applied stack according to an exemplary embodiment of the present invention;

Reference numerals set forth in the Drawings includes reference to the following elements as further discussed below:

| | |
|---|---|
| 100: MEA | 106: GDL |
| 200: bipolar plate | 202: bipolar plate channel |
| 204: bipolar plate land | |

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiment of the present invention will be described in detail with reference to the accompanying drawings.

The present invention provides a fuel cell stack with enhanced freeze-thaw durability by reducing generation of ice in a fuel cell through application of a GDL that can minimize contact resistance in the cell under a fuel cell freeze-thaw cycle condition.

The inherent anisotropic characteristics of a gas diffusion layer may be used to reduce the contact resistance in a fuel cell.

In a conventional manufacturing process, in a GDL including carbon fiber felt or carbon fiber paper that is widely used for a fuel cell vehicle as a macro-porous substrate, the carbon fiber may be preferentially oriented in one direction (i.e., MD) to have mechanical properties such as bending stiffness and tensile stress greater than those in the other direction (i.e., cross-machine direction (CMD), also called as transverse direction (TD)). Accordingly, the MD of fabrics of a GDL roll may usually be a high stiffness direction, and the CMD may be a low stiffness direction.

In the fuel cell stack according to the exemplary embodiment of the present invention, an angular range between the MD (high stiffness direction) of the GDL roll and the major flow field direction of the bipolar plate may be greater than about 0 degrees, and equal to or smaller than about 90 degrees. More preferably, the GDL roll may be cut such that the angular range becomes greater than about 25 degrees, and equal to or smaller than about 90 degrees.

More specifically, as shown in a related art of FIG. 3A, when a GDL roll is cut, it may be cut such that the MD of the GDL runs parallel to the major flow field direction of the bipolar plate. However, as shown in an embodiment of FIG. 3B, a GDL may be cut such that the MD of the GDL does not run parallel to the major flow field direction of the bipolar plate. Accordingly, the stiffness of the GDL may increase in the width (W) direction that crosses the major flow field direction of the bipolar plate.

It has been described as an example that the cutting of the GDL roll is performed such that the MD of GDL roll and the major flow field direction of the bipolar plate cross each other at an angle equal to or smaller than about 90 degrees. For example, the GDL roll may be cut such that the two directions cross each other at an angle of about 30 degrees, 45 degrees, and 60 degrees in order to increase the freeze-thaw durability of the fuel cell stack.

Thus, the GDL intrusion into gas channels of the bipolar plate can be reduced and an unnecessary gap in which water is frozen into ice can be reduced at an interface between the GDL and the MEA or the GDL and the bipolar plate. Accordingly, the freeze-thaw durability of the fuel cell stack can be improved.

The Taber bending stiffness of the MD (high stiffness direction) of the GDL roll may range from about 20 g$_f$·cm to about 150 g$_f$·cm, and in some instances from about 50 g$_f$·cm to about 100 g$_f$·cm. If the Taber bending stiffness is smaller than about 20 g$_f$·cm, the stiffness is too small for the GDL to be used for a fuel cell vehicle. If the Taber bending stiffness is greater than 150 g$_f$·cm, the GDL becomes so stiff that the GDL cannot be stored in a roll form, thus causing a reduction in the mass-productivity of GDL.

Also, the macro-porous substrate of the GDL mounted in the stack according to an exemplary embodiment of the present invention may be configured with carbon fiber felt, carbon fiber paper, or a combination thereof. Thus, since the MD (high stiffness direction) of the GDL and the major flow field direction of the bipolar plate are not parallel to each other, and carbon fiber felt or carbon fiber paper is used as a macro-porous substrate of the GDL, the contact resistance of the fuel cell can be reduced, and the interface between components of the fuel cell can be suitably maintained, thereby minimizing ice generation.

That is, the decrease in performance of the fuel cell due to increase in the contact resistance can be reduced by decreasing the contact resistance between the GDL and the bipolar plate land, or between the GDL and the MEA. Also, since the interface between the GDL and MEA, or between the GDL and the bipolar plate can be suitably maintained, a gap in which generated water is frozen into ice may be significantly reduced, thereby improving the freeze-thaw durability.

Figure 4:
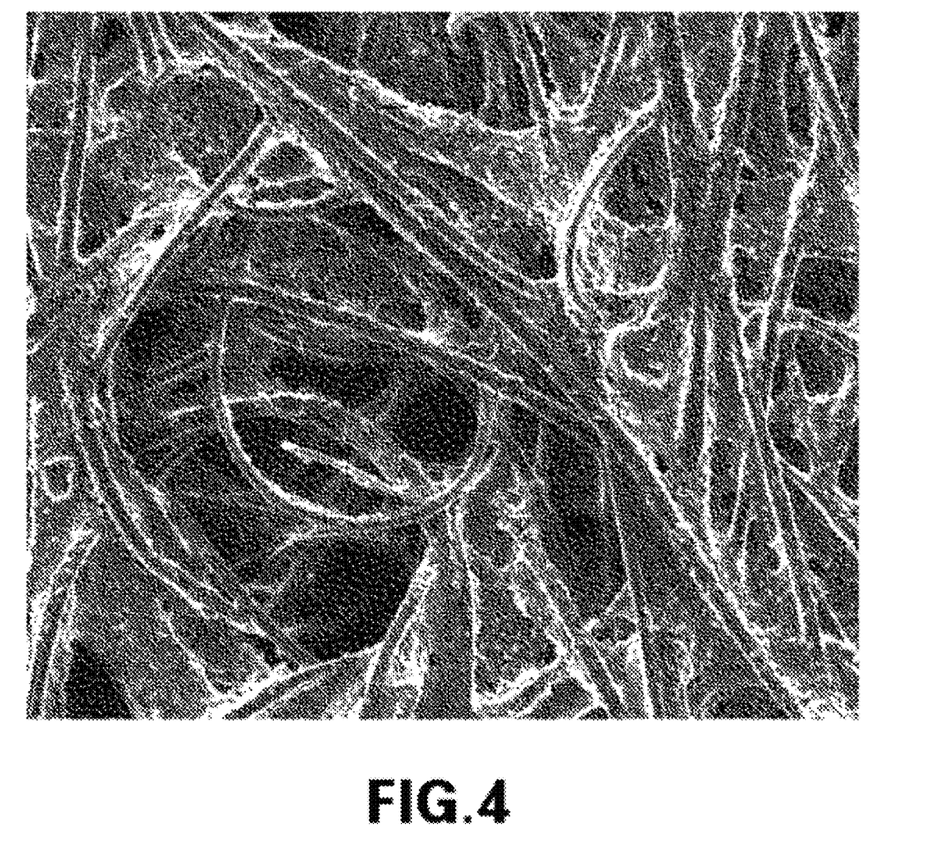
FIG. 4 is a scanning electron microscope (SEM) photograph (500×) illustrating a macro-porous substrate of the GDL used in an exemplary embodiment of the present invention and in the related art.

The fundamental characteristics of the carbon fiber felt-type GDL used in the present embodiment will be described in Table 1 below. The macro-porous substrate may be configured with typical carbon fiber felt as shown in FIG. 4 that is a magnified view of about 500× by a scanning electron microscope. It can be seen that the carbon fibers are irregularly entangled.

As described in Table 1 below, the bending stiffness of the GDL has been measured with respect to MD and CMD at a bending angle of 15 degrees using a Taber Industries Stiffness Tester.

TABLE 1

| Type of Macro-Porous Substrate | Thickness [µm] | Weight per Unit Area [gm$^{-2}$] | Bending Stiffness [Taber Stiffness Unit, g$_f$ · cm] | |
| --- | --- | --- | --- | --- |
| | | | MD | CMD |
| Carbon Fiber Felt | 426 ± 10 | 135 ± 2 | 64.87 ± 6.97 | 12.62 ± 0.38 |

Hereinafter, an embodiment and a test example of the present invention will be described in further detail.

Embodiment

As an embodiment of the present, a GDL roll was cut such that the MD (high stiffness direction) of the GDL roll is perpendicular to the major flow field direction of the bipolar plate (cutting angle of about 90 degrees). The GDLs were assembled into a 5-cell stack together with overall components such as MEAs, metallic bipolar plates, end plates and other assembly members.

Comparative Example

As a comparative example, a GDL roll was cut such that the MD (high stiffness direction) of the roll runs parallel to the major flow field direction of the bipolar plate (cutting angle of about 0 degree). The GDLs were assembled into a 5-cell stack together with overall components such as MEAs, metallic bipolar plates, end plates and other assembly members.

Test Example

Electrochemical performance of the GDLs according to the embodiment and the comparative example was tested. That is, the electrochemical performance of fuel cell stacks including the GDLs according to the exemplary embodiment and the comparative example was compared by measuring the current-voltage (I-V) polarization characteristics based on a 5-cell stack. A typical commercialized tester was used as a tester for measuring electrochemical cell performance.

In this case, the test of the electrochemical performance of the fuel cell stacks having the GDLs according to the illustrative embodiment of the present invention and the comparative example were performed under the following conditions.

Temperature at the inlet of the fuel cell=65° C.,
Hydrogen anode/air cathode relative humidity (RH)=50%/50%,
Hydrogen anode/air cathode stoichiometric ratio (S.R.)=1.5/2.0

A freeze-thaw cycle condition applied to the exemplary embodiment of the present invention and the comparative example includes putting a five-cell stack into an environmental chamber in which the temperature is adjustable, repeating 1,000 cycles at chamber temperatures between −25° C. and 15° C., and measuring and comparing the electrochemical performance and high frequency resistance (HFR) of a stack for every 50 cycles. Here, the HFR that was measured may be a factor representing contact resistance in the cell. If the HFR increases, an interface between components is damaged or deformed, and contact becomes poor. In this instance, the HFR was measured by a typical commercialized tester under a condition of amplitude of about 5 A and frequency of about 1 kHz.

Test results of the electrochemical performance of the fuel cell stacks including the GDLs according to the illustrative embodiment of the present invention and the comparative example are shown in FIGS. 5 through 8.

Figure 5:
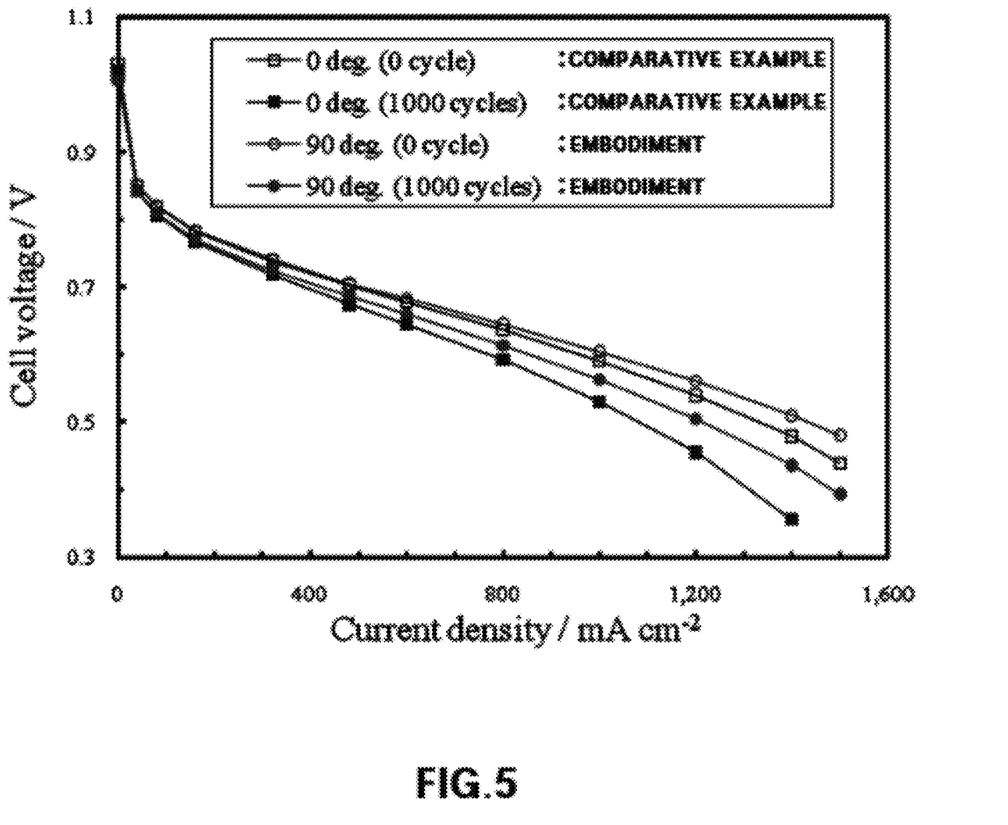
FIG. 5 is a graph illustrating the electrochemical performances before and after 1000 freeze-thaw cycles of the 0° GDL-applied stack according to a related art and the 90° GDL-applied stack according to an exemplary embodiment of the present invention.
Figure 6:
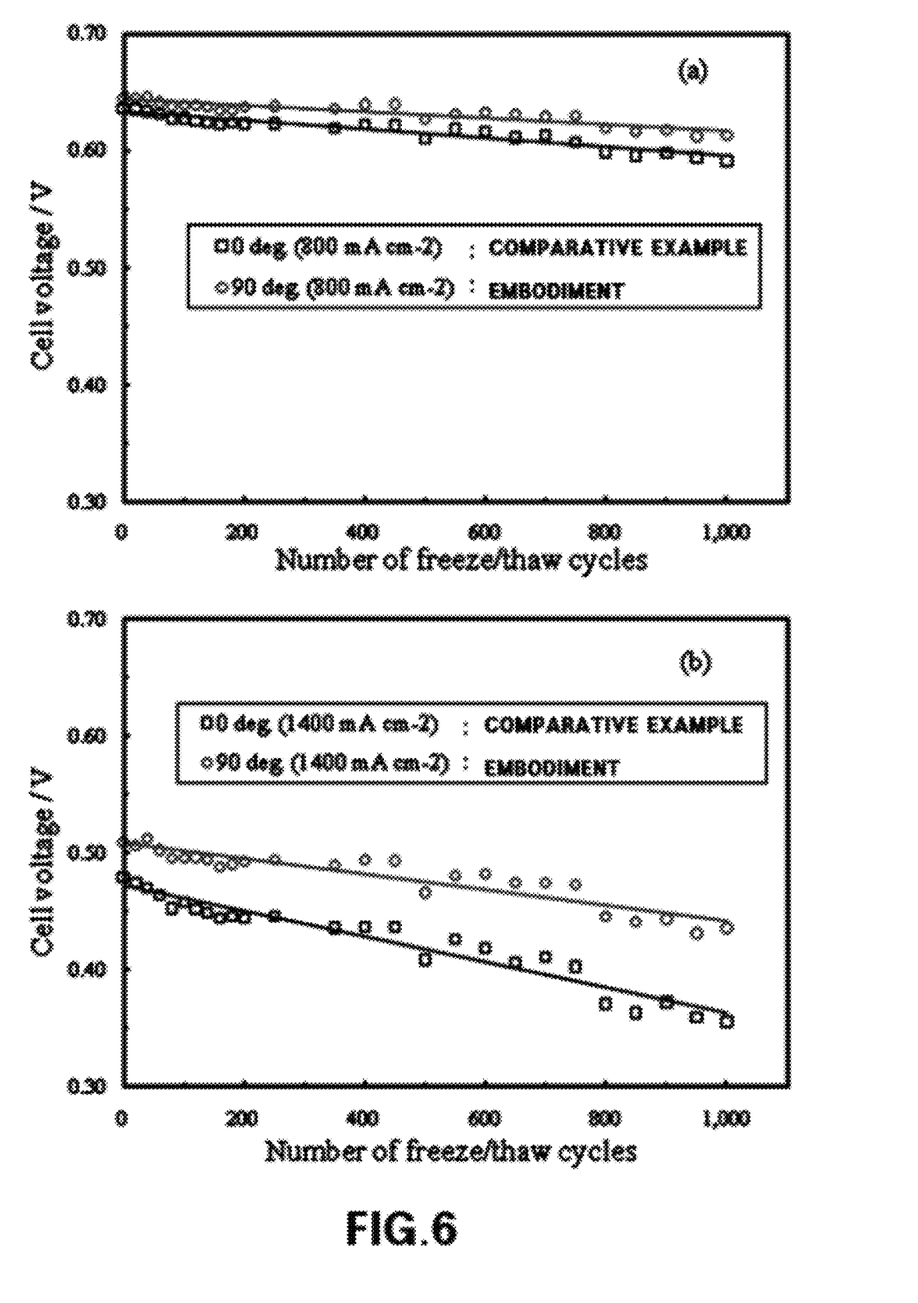
FIG. 6 is graphs illustrating the cell voltage decay as a function of number of freeze-thaw cycles of the 0° GDL-applied stack according to a related art and the 90° GDL-applied stack according to an exemplary embodiment of the present invention, in which graph (a) shows a result at a current density of 800 mA/cm$^2$ and graph (b) shows a result at a current density of 1,400 mA/cm$^2$.

The electrochemical performance of the stacks having the GDLs according to the present embodiment (90° GDL) and the related art (0° GDL) was compared with each other after completion of 1,000 freeze-thaw cycles. As shown in FIG. 5, the electrochemical performance of the stacks of the embodiment and the comparative example were both reduced. On the contrary, the stack including the GDL according to the present embodiment showed a greater increase in electrochemical performance than the stack including the GDL according to the related art after both 0 freeze-thaw cycles and 1,000 freeze-thaw cycles. Further, the same was true for the performance decay rate.

For the quantitative evaluation of the electrochemical performance decay rate of the stacks as a function of the number of the freeze-thaw cycles, a medium current density of about 800 mA/cm$^2$ and a high current density of about 1,400 mA/cm$^2$ were selected as representative fuel cell operation conditions. Cell voltage drops at the above current densities were compared to each other. As shown in FIG. 6A, when the current density was 800 mA/cm$^2$, the cell voltage of the stack including the GDL according to the related art (0° GDL) decreased at a rate of about −38 µV/cycle, but the cell voltage of the stack including the GDL according to the present embodiment (90° GDL) decreased at a rate of about −27 µv/cycle. Accordingly, it can be seen that the performance of the cell stack according to the present invention was more gradually decreased than that of the cell stack according to the related art.

As shown in FIG. 6B, when the current density was 1,400 mA/cm$^2$, the cell performance decay rate increased. The cell voltage of the stack including the GDL according to the related art decreased at a rate of about −109 µv/cycle, but the cell voltage of the stack including the GDL according to the present embodiment decreased at a rate of about −66 µv/cycle. Accordingly, it can be seen that the performance of the cell stack according to the present invention was more gradually decreased at the high current density as well.

Figure 7:
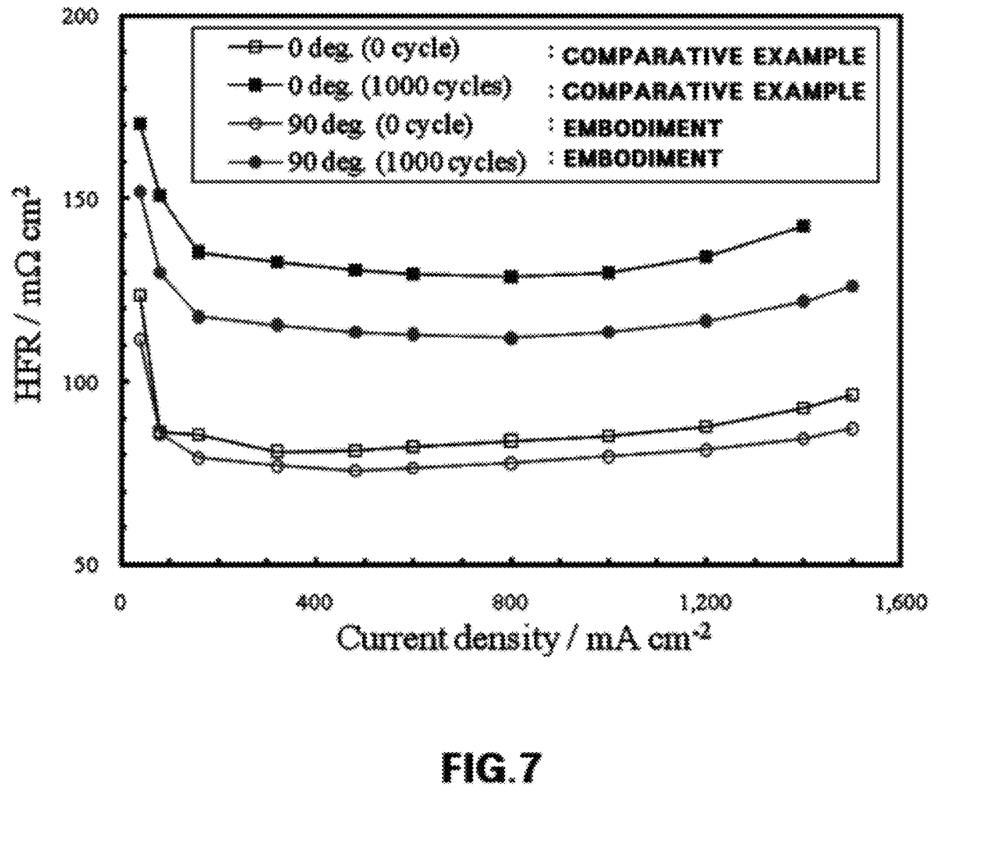
Figure 8:
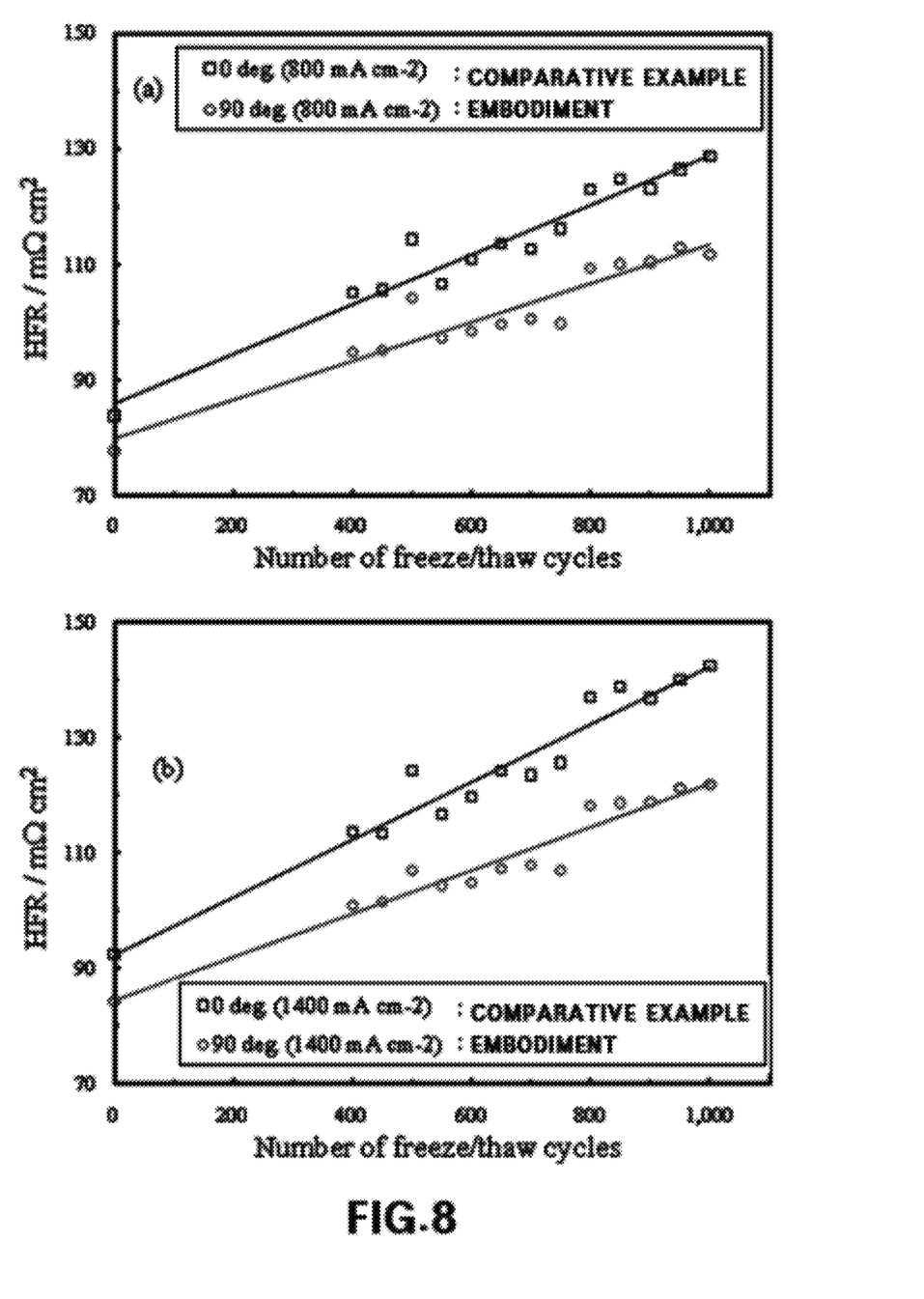
FIG. 8 is graphs illustrating the increase of high frequency resistance as a function of number of freeze-thaw cycles of the 0° GDL-applied stack according to a related art and the 90° GDL-applied stack according to an exemplary embodiment of the present invention, in which graph (a) shows a result at a current density of 800 mA/cm$^2$ and graph (b) shows a result at a current density of 1,400 mA/cm$^2$.

When changes in the contact resistance in the cell of the fuel cell stack were compared to each other, the HFRs with respect to the stack according to the comparative example of the related art and the stack according to the present embodiment were compared to one another after 1,000 freeze-thaw cycles were completed. As shown in FIG. 7, the HFRs increased in both the stack according to the present invention and the stack according to the related art after 1,000 freeze-thaw cycles.

However, the HFR with respect to the stack according to the present embodiment was smaller than the stack according to the stack according to the related art after both 0 cycles and 1,000 cycles. This means that the contact state between components in the stack cell of the present embodiment is greater than that in the stack cell according to the related art. Accordingly, it is very unlikely that ice may be generated at interfaces between components in the stack according to the present embodiment at a sub-zero temperature, and thus the cells may be less damaged under freezing conditions.

Additionally, the HFR increase rates as a function of the number of the freeze-thaw cycles were quantitatively measured. As shown in FIG. 8A, when the current density was 800 mA/cm$^2$, the HFR of the stack according to the related art increased at a rate of about 43 μΩcm$^2$/cycle, but the HFR of the stack according to the present embodiment increased at a rate of 34 μΩcm$^2$/cycle. Accordingly, it can be seen that the HFR of the stack according to the present embodiment increased more gradually than that of the stack according to the related art.

As shown in FIG. 8B, when the current density is about 1,400 mA/cm$^2$, the HFR increase rate increases in both stacks. The HFR of the stack according to the related art increased at a rate of about 50 μΩcm$^2$/cycle, but the HFR of the stack according to the present invention increased at a rate of about 38 μΩcm$^2$/cycle. Accordingly, it can be seen that the HFR of the stack according to the present embodiment increased more gradually at the high current density.

For reference, the decay rate of the cell voltage and the increase rate of the HFR after 1,000 freeze-thaw cycles are summarized as shown in Table 2 below.

TABLE 2

| Type of Stack | Cell Voltage Decay Rate [μV/cycle] | | HFR Increase Rate [μΩcm$^2$/cycle] | |
|---|---|---|---|---|
| | 800 mAcm$^{-2}$ | 1,400 mAcm$^{-2}$ | 800 mAcm$^{-2}$ | 1,400 mAcm$^{-2}$ |
| 0° GDL Stack according to Related Art | −38 | −109 | 43 | 50 |
| 90° GDL Stack according to Present Invention | −27 | −66 | 34 | 38 |

As described above, compared to the stack including the GDL (the MD of the GDL roll is parallel to the major flow field direction of the bipolar plate (cutting angle is 0 degree)) according to the related art, the stack including the GDL (the MD of the GDL roll is perpendicular to the major flow field direction of the bipolar plate (cutting angle is 90 degrees) according to the present embodiment has higher electrochemical performance, slower performance decay rate, smaller contact resistance in the cell, and a slower contact resistance increase rate during the freeze-thaw cycle. Accordingly, since the probability that ice is generated at interfaces in the cell is low, the freeze-thaw durability can be improved.

According to an embodiment of the present invention, the fuel cell stack with the GDL in which its stiffness in a width direction perpendicular to a major flow field direction of a bipolar plate is increased by cutting a rolled GDL material at a certain angle such that a MD (high stiffness direction) of GDL roll is not in parallel with the major flow field direction of the bipolar plate can have enhanced durability under freeze/thaw cycling conditions. Also, the freeze-thaw durability may be improved by reducing generation of ice at interfaces in the fuel cell.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack with enhanced freeze-thaw durability, the fuel cell stack comprising:
    a plurality of fuel cells, each of the fuel cells including:
        a polymer electrolyte membrane,
        a catalyst layer coated on at least one side of the polymer electrolyte membrane,
        a compressible gas diffusion layer (GDL) disposed on the catalyst layer, and
        a bipolar plate disposed on the compressible GDL,
        wherein the bipolar plate includes a plurality of major flow field sections and a plurality of minor flow field sections,
    wherein the compressible GDL has a width direction perpendicular to a major flow field direction of the bipolar plate and a length direction that is parallel to the major flow field direction of the bipolar plate,
    wherein the compressible GDL has a dual layer structure, the duel layer structure has a microporous layer and a macroporous substrate, the macroporous substrate comprises carbon fiber felt, carbon fiber paper or a combination thereof, the microporous layer comprises carbon powder and a hydrophobic agent comprising polytetrafluoroethylene (PTFE) and fluorinated ethylene propylene (FEP), the microporous layer has a pore size of less than about 1 μm and the macroporous substrate has a pore size of about 1 μm to about 300 μm,
    wherein an inherent high stiffness direction of the compressible GDL is arranged in only one direction, wherein the inherent high stiffness direction of the compressible GDL is arranged in a direction to have mechanical properties including bending stiffness and tensile stress greater than those in other directions, and the inherent high stiffness direction is not parallel with the length direction of the compressible GDL at a certain angle at which the compressible GDL is cut from a roll of GDL material, the certain angle formed by a machine direction of the inherent high stiffness of a roll of GDL material with respect to the major flow field direction of the bipolar plate, and the inherent high stiffness direction is not parallel with the major flow field direction of the bipolar plate when the compressible GDL is stacked on the bipolar plate in the fuel cell stack to reduce contact resistance at interfaces in each of the plurality of fuel cells.

2. The fuel cell stack of claim 1, wherein the compressible GDL is cut from a roll of GDL material at a certain angle to have the inherent high stiffness direction of the compressible GDL to be formed at an angle in a range of 60°≤θ≤90° with respect to the major flow field direction of the bipolar plate.

3. The fuel cell stack of claim 1, wherein the compressible GDL has a Taber bending stiffness ranging from 20 g$_f$·cm to 150 g$_f$·cm.

4. The fuel cell stack of claim 1, wherein the compressible GDL has a Taber bending stiffness of ranging from 50 $g_f$·cm to 100 $g_f$·cm.

5. The fuel cell stack of claim 1, wherein the microporous layer contacts the catalyst layer.

6. A compressible gas diffusion layer (GDL) for a fuel cell with enhanced freeze-thaw durability, the compressible GDL comprising
a structure with reduced contact resistance at interfaces in a fuel cell and has an inherent high stiffness direction that is not parallel to a length direction of the compressible GDL at a certain angle at which the compressible GDL is cut from a roll of GDL material, the certain angle formed by a machine direction of the inherent high stiffness of a roll of GDL material with respect to a major flow field direction of a bipolar plate and, at a same time, to a major flow field direction of a bipolar plate when the compressible GDL is stacked on the bipolar plate in the fuel cell,
wherein the compressible GDL has a width direction that is perpendicular to the major flow field direction of the bipolar plate and the length direction that is in parallel with the major flow field direction of the bipolar plate,
wherein the compressible GDL has a dual layer structure made up of a microporous layer and a macroporous substrate, the macroporous substrate comprises carbon fiber felt, carbon fiber paper or a combination thereof, and
wherein the inherent high stiffness direction of the compressible GDL is arranged in only one direction on the macroporous substrate and is arranged in a direction to have mechanical properties including bending stiffness and tensile stress greater than those in other directions.

7. The compressible GDL of claim 6, wherein the compressible GDL has a Taber bending stiffness ranging from 20 gf·cm to 150 gf·cm.

8. The compressible GDL of claim 6, wherein the compressible GDL has a Taber bending stiffness ranging from 50 gf·cm to 100 gf·cm.

9. The compressible GDL of claim 6, wherein the microporous layer is in contact with a catalyst layer coated on a polymer electrode membrane.

10. A fuel cell stack with enhanced freeze-thaw durability, the fuel cell stack comprising:
a plurality of fuel cells, each of the fuel cells including: a polymer electrolyte membrane, a catalyst layer coated on at least one side of the polymer electrolyte membrane, a compressible gas diffusion layers layer (GDL) disposed on the catalyst layer, and a bipolar plate disposed on the compressible GDL,
wherein the bipolar plate includes a plurality of major flow field sections and a plurality of minor flow field sections,
wherein the compressible GDL has a width direction perpendicular to a major flow field direction of the bipolar plate and a length direction that is parallel to the major flow field direction of the bipolar plate,
wherein the compressible GDL has a dual layer structure, the duel layer structure has a microporous layer and a macroporous substrate, wherein the macroporous substrate comprises carbon fiber felt, carbon fiber paper or a combination thereof, the microporous layer comprises the combination of carbon powder and a hydrophobic agent comprising polytetrafluoroethylene (PTFE) and fluorinated ethylene propylene (FEP), the microporous layer has a pore size of less than about 1 µm, and the macroporous substrate has a pore size of about 1 µm to about 300 µm,
wherein an inherent high stiffness direction of the macroporous substrate of the compressible GDL is arranged in only one direction, wherein the inherent high stiffness direction is arranged in a direction to have mechanical properties including bending stiffness and tensile stress greater than those in other directions, the inherent high stiffness direction is not parallel with the length direction of the compressible GDL, the inherent high stiffness direction is not parallel with the major flow field direction of the bipolar plate in the fuel cell stack to reduce contact resistance at interfaces in each of the plurality of fuel cells, the inherent high stiffness direction is formed at a certain angle with respect to the major flow field direction of the bipolar plate when the compressible GDL is stacked on the bipolar plate in the fuel cell stack, and the compressible GDL is cut from a roll of GDL material at the certain angle, and
wherein the certain angle is an angle in a range of ° 60°≤θ<90°.

11. The fuel cell stack of claim 1, wherein the inherent high stiffness direction of the compressible GDL is oriented in only one direction by carbon fibers in the macroporous substrate and the carbon fibers are irregularly entangled.

12. The fuel cell stack of claim 10, wherein the inherent high stiffness direction of the macroporous substrate of the compressible GDL is oriented in only one direction by carbon fibers in the macroporous substrate and the carbon fibers are irregularly entangled.

13. A fuel cell stack with enhanced freeze-thaw durability, the fuel cell stack comprising:
a plurality of fuel cells, each of the fuel cells including: a polymer electrolyte membrane, a catalyst layer coated on at least one side of the polymer electrolyte membrane, a compressible gas diffusion layer (GDL) disposed on the catalyst layer, and a bipolar plate disposed on the compressible GDL,
wherein the bipolar plate includes a plurality of major flow field sections and a plurality of minor flow field sections,
wherein the compressible GDL has a width direction perpendicular to a major flow field direction of the bipolar plate and a length direction that is parallel to the major flow field direction of the bipolar plate,
wherein the compressible GDL has a dual layer structure, the duel layer structure having a microporous layer and a macroporous substrate, wherein the macroporous substrate made of carbon fiber felt, carbon fiber paper or a combination thereof, the microporous layer made of the combination of carbon powder with hydrophobic agent comprising polytetrafluoroethylene (PTFE) and fluorinated ethylene propylene (FEP), the microporous layer has a pore size of less than about 1 µm and the macroporous substrate has a pore size of about 1 µm to about 300 µm,
wherein the compressible GDL has a structure that reduces contact resistance at interfaces in each of the plurality of fuel cells and has an inherent high stiffness direction which is not parallel with the length direction of the compressible GDL and the major flow field direction of the bipolar plate at a certain angle at which the compressible GDL is cut from a roll of GDL material, wherein the certain angle is formed by a machine direction of the inherent high stiffness of the roll of GDL material with respect to the major flow field direction of the bipolar plate, and the inherent high stiffness direction is arranged in only one direction on the macroporous substrate of the compressible GDL and is arranged in a direction to have mechanical properties including bending stiffness and tensile stress greater than those in other directions, and wherein the certain angle is an angle in a range of $60°≤θ≤90°$, the certain angle formed by the machine direction of the inherent high stiffness of the roll of GDL material with respect to the major flow field direction of the bipolar plate.

* * * * *